United States Patent

[11] 3,619,178

[72] Inventor Rowland E. Felt
    Richland, Wash.
[21] Appl. No. 877,039
[22] Filed Nov. 14, 1969
[45] Patented Nov. 9, 1971
[73] Assignee The United States of America as represented by the United States Atomic Energy Commission

[54] PROCESS FOR DIRECTLY REDUCING PLUTONIUM DIOXIDE TO PLUTONIUM
4 Claims, No Drawings

[52] U.S. Cl. .................................................. 75/84.1, 75/84.1 A
[51] Int. Cl. .................................................. C22b 61/04
[50] Field of Search .................................... 75/84.1; 23/325, 344

[56] References Cited
UNITED STATES PATENTS

| | | | |
|---|---|---|---|
| 2,890,110 | 6/1959 | Baker | 75/84.4 X |
| 2,908,563 | 10/1959 | Weissman et al. | 75/84.1 |
| 3,049,423 | 8/1962 | Reavis et al. | 75/84.1 |
| 3,147,109 | 9/1964 | Knighton et al. | 75/84.1 |

Primary Examiner—Carl D. Quarforth
Assistant Examiner—R. E. Schafer
Attorney—Roland A. Anderson ABSTRACT: Plutonium dioxide is reduced to plutonium metal by adding the plutonium dioxide and calcium to a flux consisting of 5 to 20 weight percent calcium fluoride and 95 to 80 weight percent calcium chloride held at about 800° C. The plutonium dioxide and calcium may be added simultaneously or sequentially; however, the weight of unreacted plutonium dioxide in the flux must never exceed 20 percent of the weight of the flux and no more than a slight excess of calcium may be present in the flux. The plutonium metal is removed to one vessel and the salt removed to another where it is contacted with calcium-30 weight percent zinc to remove residual plutonium therefrom.

PROCESS FOR DIRECTLY REDUCING PLUTONIUM DIOXIDE TO PLUTONIUM

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the preparation of plutonium. In more detail, the invention relates to a process for reducing plutonium dioxide directly to plutonium metal.

Aqueous processes currently used for processing irradiated nuclear fuels to recover plutonium therefrom result in an aqueous solution of plutonium nitrate. The preparation of plutonium from this plutonium nitrate involves three basic steps: (1) conversion of purified plutonium nitrate to oxide, (2) fluorination of the oxide and (3) reduction of the fluoride to the metal with calcium. It has long been recognized that elimination of step 2, fluorination, by directly reducing oxide to the metal would be a significant improvement. Fluorination with hydrogen fluoride gas is a constant source of equipment and operating difficulty, and causes a significant release of neutrons by $\alpha, n$ reaction with fluorine. This creates an avoidable exposure of personnel to ionizing radiation.

Another source of concern is the cost of recovering the plutonium from waste streams generated by current production procedures. A number of these waste streams exist and it is currently estimated that 20 to 30 percent of the capacity of the Plutonium Reclamation Facility at Hanford is required to handle current waste streams of the plutonium metal production facilities.

Thus many attempts have been made to develop a commercially feasible procedure for directly reducing plutonium dioxide to metallic plutonium. These attempts have failed because the heat of the reduction reaction has not been sufficient to melt the resulting slag and keep it molten long enough to allow the plutonium metal to coalesce into a single button at the bottom of the reaction vessel. Thus a bomb reduction process employing calcium and iodine to reduce plutonium dioxide yields finely divided plutonium powder which is not readily separable from the slag. The reduction of plutonium dioxide with calcium in a salt flux intended to dissolve the calcium oxide formed in the reaction has also been found to be impractical due mainly to the rapid separation of the metal and flux phases before an appreciable amount of oxide is reduced. In addition, the fluxes are not effective in dissolving the calcium oxide formed during reduction.

Plutonium metal has been prepared by reducing the oxide with a molten magnesium-zinc alloy in the presence of fluxes composed of alkali and alkaline earth halides. Plutonium metal is obtained by distilling magnesium and zinc therefrom. Since a magnesium salt is a component of the salt flux, a small quantity of plutonium remains in the salt flux by virtue of the reaction $3\ MgCl_2 + 2\ Pu \rightleftarrows 3\ Mg + 2PuCl_3$. An improvement thereon employs a magnesium alloy as reductant and a salt flux containing LiCl, NaCl, KCl and NaF. The lack of magnesium in the flux improves the recovery. Both of these last procedures are operable but suffer from the disadvantage that distillation is required to recover the plutonium.

An oxide reduction process which combines the features of bomb reduction with metal-salt extraction has recently been developed. The process consists of bomb-reducing plutonium dioxide with calcium in a heated tungsten vessel. The resulting fused oxide-metal "clinker" is then contacted with molten calcium chloride at 1,000° C. The calcium chloride dissolves the calcium oxide formed. The excess calcium floats to the top of the salt flux, leaving molten plutonium in the bottom of the vessel. Agitation was found to be essential for the salt flux to dissolve the calcium oxide. Although theoretically practicable, a number of engineering problems have militated against development of this procedure for use on a commercial scale.

Thus no thoroughly satisfactory practical procedure for reducing plutonium dioxide to plutonium directly on a commercial scale has yet been developed.

It is accordingly an object of the present invention to develop a process for reducing plutonium dioxide to plutonium directly.

It is another object of the present invention to develop a process for preparing high-purity plutonium from plutonium dioxide.

It is still another object of the present invention to develop such a process in which a high yield of plutonium is obtained without expensive reprocessing of waste streams.

It is an additional object of the present invention to develop such a process in which extensive agitation during the reduction process is not necessary.

It is a further object of the present invention to develop such a process in which the plutonium is obtained directly as a pure metal in unalloyed form.

SUMMARY OF THE INVENTION

These and other objects of the present invention are attained by reducing plutonium dioxide with calcium dissolved in a flux consisting of 5 to 20 weight percent calcium fluoride and 95 to 80 weight percent calcium chloride at about 800° C. Addition of the reactants is controlled so that there is never more than 20 weight percent unreacted plutonium dioxide in the salt and no more than a slight excess of calcium over the stoichiometric quantity necessary is ever present in the salt.

SPECIFIC EMBODIMENT OF THE INVENTION

According to one embodiment of the present invention, plutonium dioxide is added to a salt flux consisting of the calcium chloride-calcium fluoride eutectic (calcium chloride–20 weight percent calcium fluoride) at 800° C. to a concentration of 20 weight percent. The salt flux becomes viscous and difficult to stir at higher concentrations of plutonium dioxide. Solid granules of calcium metal are then added to the plutonium dioxide - salt mixture at a controlled rate. This feature—addition of the reductant to the molten salt—is believed to be new and is critical to the invention. The calcium readily dissolves in the flux and immediately reacts with the plutonium dioxide. The temperature of the melt increases because of the exothermic reaction between the dissolved calcium and suspended plutonium dioxide. The rate of addition of the calcium is controlled to prevent the temperature from increasing too greatly. Because the calcium readily dissolves in the salt flux, vigorous agitation typical of solid-liquid contact operations is not required. Thus agitation is not an important factor in this process. Nondependence on mechanical stirring is a real benefit because of a reduction in the magnitude of many corrosion and containment materials problems.

Sufficient calcium is added to completely reduce the plutonium dioxide present in the salt. It is important not to use a large excess of calcium because the viscosity of the salt flux increases rapidly with calcium concentration. Thus excess calcium added to the process produces a highly viscous melt which inhibits coalescence of the plutonium metal.

Additional plutonium dioxide may then be added with the same concentration constraint as on the first charge and reacted with additional stoichiometric quantities of calcium. That is, following reaction of the first increment of plutonium dioxide, additional increments of plutonium dioxide may be added provided the total weight of unreacted plutonium dioxide in the salt flux never exceeds 20 weight percent of the weight of the salt flux. When the reduction has been completed a small excess, about 5 weight percent of calcium, is added to ensure complete reduction. The individual batch size is limited by the calcium oxide containment capability of the salt flux. The total accumulated plutonium content from several batch reductions is limited by criticality considerations. It is contemplated that a commercial scale process could be carried out by metering plutonium dioxide and calcium simultaneously into the salt flux to the limit of the capacity of the salt flux, making certain that the concentration of unreacted plutonium dioxide and of unreacted calcium do not exceed the limits set forth above.

The plutonium metal formed in the reduction reaction forms into drops and settles into the bottom of the reduction crucible. From there it is siphoned to a receiver vessel wherein the plutonium metal is allowed to cool and solidify. An inert argon atmosphere is maintained in all process vessels because of the reactive nature of plutonium.

The salt flux containing calcium oxide is siphoned from the reduction crucible to a salt-contacting vessel where it is contacted with calcium -30 weight percent zinc alloy. Any unreduced plutonium dioxide carried over is reduced and alloyed during this second contact. Distillation is employed to free the plutonium of alloying materials. The spent salt flux carrying the calcium oxide can be disposed of since it contains less than 0.05 weight percent plutonium.

Shear-formed tungsten crucibles should be used for all contacting operations. As shown in the experiments described in the following table, magnesium-titanium oxide crucibles are also acceptable for experimental use. Tantalum or tantalum-10 percent tungsten tubing is used for plutonium transfer and the plutonium receiver vessel and stainless steel is adequate for salt transfer. The contacting vessels and receiver vessel are heated by high-frequency induction heating. The transfer lines are heated by coiled electrical heating elements. Material transfer is made by control of the pressure in each vessel.

The following table gives the experimental test results on which this invention is based.

through which the plutonium metal sinks as it is produced while the calcium remains dissolved in or floating on the salt.

A definite advantage of calcium metal is its limited solubility in the salt flux. Reaction between calcium and plutonium dioxide suspended in the salt flux is much more rapid if the calcium is dissolved in the flux. Slow reaction rates occur if physical interface contact is required between a coalesced metal phase and the suspended oxide in the salt phase. Physical mixing becomes very important when such interface contacting is required. By dissolving calcium in the salt flux the reaction rate is almost instantaneous and is not limited by interface fouling and mixing problems.

This process has been demonstrated in the laboratory by producing over 2,000 grams of high-purity metal. It is contemplated that 2 to 3 kilograms of plutonium could be produced in a batch by metering plutonium dioxide and calcium into the molten salt at a controlled rate. In a large-scale process the reactants would have to be added over a period of time to prevent the temperature from rising beyond that desired and to prevent the viscosity from rising to the point where the metal cannot coalesce.

The process has been described heretofore solely with respect to the reduction of plutonium dioxide but could also be applied to certain other metals. For example, the process could also be applied to other actinide metals and specifically might well prove to be of importance with neptunium.

It will be understood that the invention is not to be limited to the details given herein but that it may be modified within the scope of the appended claims.

The embodiments of the invention in which an exclusive property or privilege is claimed are defined as follows:

| Test No. | Metal phase, grams | Salt phase, grams | Temperature, °C. | Plutonium, grams | Metal yield, per cent | Test conditions | Observations |
|---|---|---|---|---|---|---|---|
| 1 | Ca 5 | CaCl$_2$ 15 | 1,000 | PuO$_2$ 5 | 32 | PuO$_2$ added to molten system using MgO-TiO$_2$ crucible. | Gas evolved, Ca badly oxidized. |
| 2 | Ca 5 | CaCl$_2$ 26.5 | 1,000 | PuO$_2$ 10 | | Components layered, PuO$_2$ on CaCl$_2$ on Ca. | PuO$_2$ blown out of crucible by gases evolved. |
| 3 | Ca 5 | CaCl$_2$ 30 | 1,000 | PuO$_2$ 10 | 77 | PuO$_2$ added to molten system. | Gas evolved. |
| 4 | Ca 10 | CaCl$_2$ 20 | 1,000 | PuO$_2$ 16 | | do | Poor metal coalescence. |
| 5 | Ca 130 | CaCl$_2$-20% CaF 300 | 1,000 | PuO$_2$ 100 | | do | Metal coated on crucible walls. |
| 6 | Ca 200 | CaCl$_2$-20% CaF$_2$ 500 | 1,000 | PuO$_2$ 110 | | PuO$_2$ added intermittently. | Poor metal coalescence. |
| 7 | Ca 200 | Same as above 500 | 970 | PuO$_2$ 118 | | Ta crucible—PuO$_2$ added intermittently. | Oxide reduced but metal did not coalesce. Apparent viscosity problem. |
| 8 | Ca 200 | do 500 | 1,900 | PuO$_2$ 111 | | Ca added to molten salt, PuO$_2$ added to molten system. | Viscous melt—reason for high viscosity unknown. |
| 9 | Ca 41 | do 750 | 800 | PuO$_2$ 111 | 60 | PuO$_2$ mixed with salt, Ca added to molten system. | Improved viscosity and metal coalescence. |
| 10 | Ca 48 | do 750 | 800 | PuO$_2$ 130 | 94 | PuO$_2$ mixed with salt, Ca added to molten system except MgO-TiO$_2$ crucible. | Clean metal button, good coalescence. White smoke evolved. |
| 11 | Ca 100 | do 600 | 800 | PuO$_2$ 300 | 97 | do | |
| 12 | Ca 100 | do 1,200 | 800 | PuO$_2$ 300 | | do | Viscosity problem due to large PuO$_2$ loading. |
| 13 | Ca 60 | do 1,200 | 800 | PuO$_2$ 170 | 90 | do | |
| 14 | Ca 100 | do 1,200 | 800 | PuO$_2$ 300 | 99 | Same as 10 but alternated Ca and PuO$_2$ additions. | System is working. |
| 15 | Ca 300 | do 1,400 | 800 | PuO$_2$ 500 | 100 | Ca and PuO$_2$ additions same as 14. | Do. |
| 16 | Ca 300 | do 1,400 | 800 | PuO$_2$ 500 | 100 | do | Do. |

After cleanup the salt contained approximately 0.06 percent plutonium which was less than 0.1 percent of plutonium introduced into the system.

It will be noted that the successful tests reported in the above table all employed as salt flux an 80/20 mixture of calcium chloride and calcium fluoride. Other tests have shown that as little as 5 percent calcium fluoride can be present in the flux. It is, however, essential that at least 5 percent be present if the temperature of operation is to be maintained as low as 800° C. Also a small quantity of fluoride is necessary to "wet" the oxide by a mechanism not fully understood.

The choice of calcium as reductant was indicated primarily because of its low melting point and the viscosity of the slag produced. For oxide reduction, none of the slags formed by any of the active metals has a sufficiently low melting point to permit plutonium metal separation from the slag. For this reason, the addition of a molten salt flux is needed to lower the reaction temperature to a workable level. The density of plutonium and calcium span the nominal density of any molten salt flux. This permits the salt flux to act as a separation barrier 1. A method of reducing plutonium dioxide to plutonium comprising heating a salt flux consisting of 5 to 20 weight percent calcium fluoride and 95 to 80 weight percent calcium chloride to approximately 800° C., adding plutonium dioxide and calcium to the molten salt flux at such a rate that the weight of unreacted plutonium dioxide in the salt flux never exceeds 20 percent of the weight of the flux and no more than a slight excess of calcium is ever present in the salt flux, and recovering the plutonium from the slag.

2. A method according to claim 1 wherein the plutonium dioxide and calcium are added simultaneously to the molten salt flux.

3. A method according to claim 1 wherein up to 20 weight percent plutonium dioxide is added to the molten salt flux, a stoichiometric quantity of calcium is then added to the molten salt flux, further additions of plutonium dioxide and calcium are made to the salt flux observing the same concentration constraints, and 5 weight percent of calcium in excess of the stoichiometric requirements is added after the reaction is essentially complete.

4. A method according to claim 1 wherein the plutonium is recovered by siphoning the plutonium from beneath the salt flux and by siphoning the salt flux containing calcium oxide to a second vessel, contacting the mixture with calcium-30 weight percent zinc, discarding the spent salt flux containing calcium oxide, and recovering residual plutonium as an alloy with zinc.

* * * * *